US012515210B2

(12) United States Patent
Hyldtoft

(10) Patent No.: US 12,515,210 B2
(45) Date of Patent: Jan. 6, 2026

(54) REGENERATING THE CATALYTIC ACTIVITY OF A SPENT CATALYST

(71) Applicant: TOPSOE A/S, Kgs. Lyngby (DK)

(72) Inventor: Jens Henrik Hyldtoft, Skibby (DK)

(73) Assignee: TOPSOE A/S, Kgs. Lyngby (DK)

( * ) Notice: Subject to any disclaimer, the term of this patent is extended or adjusted under 35 U.S.C. 154(b) by 391 days.

(21) Appl. No.: 18/000,570

(22) PCT Filed: Jun. 23, 2021

(86) PCT No.: PCT/EP2021/067141
§ 371 (c)(1),
(2) Date: Dec. 2, 2022

(87) PCT Pub. No.: WO2022/008248
PCT Pub. Date: Jan. 13, 2022

(65) Prior Publication Data
US 2023/0211333 A1     Jul. 6, 2023

(30) Foreign Application Priority Data
Jul. 6, 2020   (EP) .................................... 20184275

(51) Int. Cl.
| | |
|---|---|
| *B01J 38/60* | (2006.01) |
| *B01J 6/00* | (2006.01) |
| *B01J 21/06* | (2006.01) |
| *B01J 23/755* | (2006.01) |
| *B01J 35/55* | (2024.01) |
| *B01J 37/08* | (2006.01) |
| *B01J 37/18* | (2006.01) |
| *B01J 38/02* | (2006.01) |
| *B01J 38/62* | (2006.01) |
| *C01B 3/38* | (2006.01) |
| *C01B 3/40* | (2006.01) |
| *C01B 32/40* | (2017.01) |

(52) U.S. Cl.
CPC ............... *B01J 38/60* (2013.01); *B01J 6/001* (2013.01); *B01J 21/066* (2013.01); *B01J 23/755* (2013.01); *B01J 37/08* (2013.01); *B01J 37/18* (2013.01); *B01J 38/02* (2013.01); *B01J 38/62* (2013.01); *C01B 3/388* (2013.01); *C01B 3/40* (2013.01); *C01B 32/40* (2017.08); *B01J 35/55* (2024.01); *B01J 2235/15* (2024.01); *C01B 2203/0233* (2013.01)

(58) Field of Classification Search
CPC . B01J 38/60; B01J 6/001; B01J 21/066; B01J 23/755; B01J 35/50; B01J 37/08; B01J 37/18; B01J 38/02; B01J 38/62; B01J 25/04; B01J 23/94; C01B 3/388; C01B 3/40; C01B 32/40; C01B 2203/0233
See application file for complete search history.

(56) References Cited

U.S. PATENT DOCUMENTS

| | | | |
|---|---|---|---|
| 6,896,868 B2 | 5/2005 | Wang et al. | |
| 7,956,000 B2 | 6/2011 | Jansen et al. | |
| 2003/0144129 A1* | 7/2003 | Clark | B01J 38/62 502/28 |
| 2008/0083658 A1* | 4/2008 | Mesters | B01J 35/396 208/217 |

FOREIGN PATENT DOCUMENTS

| | | | |
|---|---|---|---|
| CN | 1617763 A | 5/2005 | |
| CN | 103506122 A | 1/2014 | |
| CN | 105492377 A | 4/2016 | |
| CN | 108067242 A | 5/2018 | |
| CN | 108328573 A | 7/2018 | |
| EP | 0535505 A1 | 4/1993 | |
| EP | 0624400 A1 | 11/1994 | |
| WO | 03064033 A1 | 8/2003 | |
| WO | 2014150057 A1 | 9/2014 | |
| WO | WO-2019021244 A1 * | 1/2019 | ......... B01D 53/9418 |
| WO | 2019228795 A1 | 12/2019 | |
| WO | 2019228797 A1 | 12/2019 | |
| WO | 2019228798 A1 | 12/2019 | |

OTHER PUBLICATIONS

Oza et al., "Nickel Recovery from Spent Ni/Al2O3 Catalysts Using Nitric Acid Solution" Asian Journal of Water, Environment and Pollution 8, Mar. 2011, 51-58 (Year: 2011).*
European Search Report dated Dec. 15, 2020, issued by the European Patent Office in corresponding European Application No. 20184275.4. (7 pages).
International Search Report (PCT/ISA/210) and Written Opinion (PCT/ISA/237) mailed on Sep. 22, 2021, by the European Patent Office as the International Searching Authority for International Application No. PCT/EP2021/067141. (13 pages).
Yang Jun-Ying, "Sintering and Method of Regeneration of Supported Ni Catalysts," Journal of Catalysis, May 31, 1991, vol. 12, No. 3, 230-234.
First Office Action mailed on Jul. 2, 2024 with English translation only, by the Chinese National Intellectual Property Administration, in related Chinese Application 202180047808.3, 9 pages.
Bo Li and Jing Wang, New Energy Vehicle Technology, Shanghai: Shanghai Jiao Tong University Press, Apr. 30, 2017, p. 118.

* cited by examiner

Primary Examiner — Anthony J Zimmer
Assistant Examiner — Abdul-Rahman Yusuf Waleed Smari
(74) Attorney, Agent, or Firm — Boone IP Law

(57) ABSTRACT

The invention relates to a method of regenerating the catalytic activity of a spent catalyst comprising nickel on a refractory oxide support, said method comprising the steps of contacting the spent catalyst with a nitric acid solution, heat-treating the spent catalyst, calcining and reducing the catalyst.

13 Claims, No Drawings

REGENERATING THE CATALYTIC ACTIVITY OF A SPENT CATALYST

FIELD OF THE INVENTION

The present invention relates to a method of regenerating the catalytic activity of a spent catalyst, e.g. for regenerating part of the catalytic activity of a spent catalyst, more particularly a spent steam reforming catalyst comprising nickel on a refractory support, such as a spent steam reforming catalyst in which the nickel content is 5-20 wt % Ni on alumina. The invention also concerns a steam reforming process using the refreshed catalyst prepared according to the method.

BACKGROUND OF THE INVENTION

Conventionally, the production of synthesis gas, i.e. a gas rich in hydrogen and/or carbon monoxide, requires the use of a steam methane reforming catalyst arranged as a fixed bed in a steam methane reformer, more specifically as fixed bed of catalyst within reformer tubes arranged therein. The catalyst used normally contains nickel as the active metal which is supported on a refractory oxide, such as alumina.

Currently, it is up to the customer or plant operator and not to the catalyst supplier to be concerned with what to do with a nickel reforming catalyst which has been used in industrial steam reforming, i.e. spent nickel reforming catalyst. The spent catalyst can be sent for reclaim to extract nickel or any other valuable metals or used as landfill. As part of the catalyst supply and attendant customer service, it would be desirable to offer a refresh of the spent catalyst. Spent nickel catalysts suffer from nickel crystallite sintering, which results in a loss in sulfur adsorption capacity and activity, i.e. catalytic activity.

Nitric acid ($HNO_3$) for removing or extracting metals in a catalyst has been known for decades; however, the particular problem of nickel crystallite size, re-dispersion and sintering and how to reactivate the catalyst, has been seldomly addressed.

U.S. Pat. No. 6,896,868 discloses the regeneration or reactivation of synthesis gas (syngas) catalyst due to sintering issues in connection with its deactivation during syngas production in a partial oxidation reactor and uses a re-dispersing gas technique.

EP 0,624,400 addresses the issue of increase in nickel crystallites in a steam reforming catalyst and agglomeration of catalyst particles in a fluid bed process, including oxidation in air at high temperatures along with nitric acid wash. The nitric acid is used for removing surface contaminants such as boron, calcium, silicon and sodium, and thereby reducing the agglomeration of the catalyst particles.

U.S. Pat. No. 7,956,000 describes a process for activating a hydrotreating catalyst comprising a Group VIB metal oxide and a Group VII metal oxide, comprising contacting the catalyst with an organic acid such as citric acid and an organic additive such as polyethylene glycol or glycerol.

CN 103506122 A describes the recycling of a used steam reforming catalyst comprising nickel by contacting it with a dilute nitric acid solution e.g. 5% or 10% $HNO_3$ for forming a slurry solution. After drying further compounds are admixed, finally dried at 120° C. and calcined at 600° C. The method is used for preparing new catalysts of a same type by recycling a waste catalyst as a part of raw materials for preparing the new catalyst; hence the waste catalyst is crushed (pulverized) prior so that it can incorporated in the preparation of the new catalyst.

Similarly, CN 108067242 A describes the regeneration of a hydrogenation catalyst comprising nickel, where the waste catalyst is pulverized first and contacted with an acid solution comprising dilute nitric acid (30%) as well as phosphoric acid (85% strength) and an organic acid having less than 10 carbon atoms, suitably tartaric acid, under heating up to 90° C. The resulting slurry is further mixed with alumina, dried at 110° C. and calcined. The waste catalyst after being pulverized, is thus used for producing a new hydrogenation catalyst.

SUMMARY OF THE INVENTION

It has now been found that by treating a spent catalyst with nitric acid, in particular concentrated nitric acid, and optionally one or more organic acids as promoters, it is possible in a simple manner to re-disperse the nickel, i.e. obtain a smaller nickel crystallite size—and thus obtain a gain in sulfur adsorption capacity and activity, and which still retains up to 30-50% or even higher such as 70-80% and even 100% of the original activity and/or sulfur capacity. There is otherwise no solution to this problem, except buying new catalyst i.e. a fresh catalyst. The spent catalyst is provided in the form of tablets or pellets, or as structured catalyst.

Accordingly, in a first aspect of the invention there is provided method of regenerating the catalytic activity of a spent catalyst comprising nickel, said spent catalyst being:
(a) a spent steam reforming catalyst in which the nickel content is 5-20 wt % Ni and the support is an oxide comprising aluminium, zirconium, magnesium, calcium, lanthanum, yttrium, and/or cerium, and wherein the spent catalyst is provided in the form of tablets or pellets, or (b) a spent steam reforming catalyst in which the nickel content is 5-20 wt % Ni, said spent steam reforming catalyst being a structured catalyst comprising a macroscopic structure, wherein said macroscopic structure is formed by a metallic material and at least partly support a refractory oxide support, in which the metallic material is preferably an alloy comprising Fe, Cr, and Al, the support is preferably zirconium oxide ($ZrO_2$); said method comprising only the steps of:
i) contacting the spent catalyst with a nitric acid solution, in which the nitric acid solution is at least 60 wt % $HNO_3$, such as 65 wt % $HNO_3$ or higher, and adding one or more organic acids;
ii) heat-treating the spent catalyst at a suitable temperature for reacting nickel with nitric acid, said suitable temperature being in the range 50-100° C., and subsequently drying the catalyst at 100-125° C.;
iii) calcining and reducing the catalyst, in which the calcining step is conducted in air at 500-1300° C. for 1-4 hours, and the reducing step is conducted in the presence of hydrogen at 400-600° C. for 2-4 hours.

Thereby, a refreshed catalyst is produced.

By the above combination of features, it is now possible to reactivate the spent catalyst just right by re-dispersing the nickel, without extracting or removing the nickel metal as is often intended in the prior art. Thereby it is possible to just properly reactivate the spent catalysts to be able to be reused, e.g. to 30-80%, such as 30-50% or 70-80% of the original activity.

The method comprises a step of drying the catalyst after said heat-treating, and prior to calcining.

The contacting step is preferably by impregnation, by e.g. immersion of the spent catalyst in excess of liquid.

When in contact with nitric acid, the following refresh reaction takes place:

$$Ni + 4HNO_3 = Ni(NO_3)_2 + 2NO_2 + 2H_2O$$

After the reaction is completed, the spent catalyst is optionally dried, calcined and reduced. In this manner, part of the large sintered nickel particles present in the spent catalyst are dissolved and re-dispersed during calcination and reduction, thus regaining part of the activity and sulfur adsorption capacity, i.e. the catalytic activity is regenerated.

The nitric acid solution is at least 60 wt % $HNO_3$, such as 65 wt % $HNO_3$ or higher, for instance 70, 80 or 90 wt % $HNO_3$. At these concentrations, the nitric acid solution is regarded as a concentrated nitric acid solution and is particularly suitable, since refresh reaction time and temperature can be lowered compared to when using diluted nitric acid e.g. at concentrations lower than 60 wt % $HNO_3$, in particular lower than 50 wt % $HNO_3$.

In an embodiment according to the first aspect of the invention, the method comprises adding one or more organic acids, preferably to the nitric acid solution, the one or more organic acids preferably being selected from the group: 2-hydroxypropane-1,2,3-tricarboxylic acid, 2-hydroxypropanoic acid, ethanedioic acid, propanedioic acid, 1,4-butanedioic acid, 1,3-propanedicarboxylic acid, and 2-aminopentanedioic acid. Combinations of these organic acids are also envisaged. Adding the organic acid results in even higher dispersion, i.e. also higher activity and sulfur capacity activity. The organic acid promotor effect on the nickel particle size is highly unexpected, since despite resulting in a larger nickel size, the S-capture significantly increases. In particular, when the addition of an organic acid is combined with the repeating steps as described farther below, it is even easier to regain 100% of the original activity and/or sulfur capacity. The content of the one or more organic acids in nitric acid solution is 40 wt % or less, for instance 30 wt %, 20 wt %, 10 wt % or 5 wt %.

Adding the one or more organic acids to the nitric solution enables a simpler and efficient method, as the provision of nitric acid and organic acid may be combined in one single step. In another embodiment, the one or more organic acids are added separately from the nitric acid solution, for instance by adding an organic acid after the refresh reaction with nitric acid.

As used herein, an organic acid is a compound comprising at least one carboxylic group (COOH). The organic acid may also be an amino acid, such as 2-aminopentanedioic acid.

In another embodiment according to the first aspect of the invention, there is no addition of organic additives, i.e. the spent catalyst is in contact with the nitric acid and the one or more organic acids, without including the use of organic additives, such as alcohols, e.g. aliphatic alcohols.

In another embodiment according to the first aspect of the invention, the nitric acid solution is free of, i.e. does not contain, other inorganic acids such as phosphoric acid. In other words, the only inorganic acid (mineral acid) of the nitric acid solution is nitric acid.

The spent catalyst (a) is provided in the form of tablets or pellets, such as hollow or solid extrudates. The tablets or pellets are preferably spherical, oblong, cylindrical, multi-lobe, ring-shaped, or any combinations thereof. As used herein, the term "provided in the form of tablets or pellets" means that the spent catalyst is supplied and treated according to the method of the invention in the form of tablets or pellets. It would also be understood that these catalysts have dimensions clearly visible with the naked eye, without magnifying devices; for instance, a cylindrically shaped catalyst with through holes may typically have a height of about 20 mm, diameter of 13 mm and the through holes a diameter of about 4 mm.

Hence, the spent catalyst is not subjected to a step of crushing or pulverizing for contacting with the nitric acid solution. The shape of the spent catalyst is preserved during the regenerating, i.e. refreshing, method.

In an embodiment according to the first aspect of the invention, the spent catalyst is a spent steam reforming catalyst in which the nickel content in is 5-20 wt % Ni, such as 8-16 wt % Ni, and the support comprises alumina. In a particular embodiment, the support is alumina. In another particular embodiment, the support is magnesium aluminum spinel ($MgAl_2O_4$). In another particular embodiment, the support comprises one or more calcium aluminate phases. Preferably at least one of the calcium aluminate phases is hibonite ($CaAl_{12}O_{19}$).

The spent catalyst (b) is provided in the form of a structured catalyst, in particular a structured catalyst comprising a macroscopic structure, wherein said macroscopic structure is formed by a metallic material and at least partly support a refractory oxide support. For instance, the structured catalyst can comprise a plurality of macroscopic structures, and each macroscopic structure is formed by a metallic material, which, at least partly, supports said refractory oxide support.

The structured catalyst may thus comprise a macroscopic structure of electrically conductive material. The macroscopic structure supports a refractory oxide i.e. a ceramic coating, while the ceramic coating supports the catalytically active material, such as nickel. The term "macroscopic structure supports a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating. The coating is a ceramic material with pores in the structure which allows for supporting the catalytically active material on and inside the coating. The ceramic coating may for example be an oxide comprising Al, Zr, Mg, Ce and/or Ca. An exemplary ceramic coating is zirconium oxide ($ZrO_2$). Other examples are calcium aluminate or a magnesium aluminum spinel. Such a ceramic coating may comprise further elements, such as La, Y, Ti, K, or combinations thereof.

The spent catalyst is a structured catalyst, wherein the metallic material is an alloy comprising Fe, Cr, and Al (also known as Kanthal), wherein the support is zirconium oxide ($ZrO_2$).

As used herein, the term "macroscopic structure" is meant to denote a macroscopic structure element in any appropriate form providing a high geometrical surface area. The material of the macroscopic structure may be porous, or the macroscopic structure may be a solid. The word "macroscopic" in "macroscopic structure" is meant to specify that the structure is large enough to be visible with the naked eye, without magnifying devices. The dimensions of the macroscopic structure are typically in the range of tens of centimeters or of even meters. Non-limiting examples of macroscopic structures are e.g. monoliths. Such monoliths can be both straight-channeled elements and cross-corrugated elements. Various geometries of these elements are conceivable. Hence, in an embodiment the macroscopic structure is a monolith.

Application of said refractory oxide support to the macroscopic structure may be done by wash coating. The wash coating of a metallic material surface is a well-known process; a description is given in e.g. Cybulski, A., and Moulijn, J. A., Structured catalysts and reactors, Marcel Dekker, Inc, New York, 1998, Chapter 3, and references herein.

The metallic material may be an alloy comprising one or more substances selected from the group consisting of Fe, Cr, Al, Co, Ni, Zr, Cu, Ti, Mn, and Si. Hence, the metallic material being an alloy comprising Fe, Cr, and Al, may further comprise Co, Ni, Zr, Cu, Ti, Mn, and Si, or combinations thereof.

Use of structured catalysts allows for engineering other mechanism of the catalyst such as heat transfer or heat supply into the catalyst bed. In an embodiment, such a structured catalyst is used for electrically heated steam reforming, as known from e.g. Wismann et al, Science 2019: Vol. 364, Issue 6442, pp. 756-759, or applicant's WO2019/228798, WO2019/228795 or WO 2019/228797.

As for the spent catalyst (a), the spent catalyst (b) i.e. structured catalyst comprising a macroscopic structure, is not subjected to a step of crushing or pulverizing for contacting with the nitric acid solution. The macroscopic structure is preserved during the regenerating, i.e. refreshing, method (method for regenerating the catalytic activity in accordance with the invention as recited farther above).

Accordingly, in an embodiment according to the first aspect of the invention, the tablets or pellets of spent catalyst (a) are spherical, oblong, cylindrical, multilobe, ring-shaped, or any combinations thereof; the macroscopic structure of spent catalyst (b) is a monolith; and the shape of the spent catalyst (a) or the macroscopic structure of the spent catalyst (b) is preserved during the regenerating method i.e. method of regenerating as recited above.

Since the shape or structure of the spent catalyst is preserved during the regeneration, the operation is simple as there are no need for pulverizing the spent catalyst for thereby incorporating it as raw material farther upstream in the plant and/or production process for producing the new catalyst. In fact, catalyst production sites are located in different regions e.g. countries than the actual operation site where steam reforming is conducted. By the present invention, the refreshed catalyst is thus suitably combined at the operation site with the fresh steam reforming catalyst and which is also being provided e.g. in the form of tablets or pellets. It would thus be understood that the refreshed catalyst is not transported to the catalyst production site for then being inherently mixed with the fresh steam reforming catalyst, as for instance disclosed in the above cited CN 103506122 A and CN 108067242 A, for thereby producing a new catalyst and which will then need to be supplied to the operation site where the actual steam reforming is conducted.

In an embodiment according to the first aspect of the invention, the method comprises repeating the steps of contacting and heat-treating at least once prior to said calcining or drying steps. Accordingly, the step of contacting (step i) and heat-treating in step ii) are repeated at least once prior to said drying or calcining steps. Hence, the refresh of the spent catalyst by said contacting with the nitric acid solution and subsequent heat-treating steps, is for instance conducted twice, e.g. by either calcining after a first refresh or just drying after the first refresh, thereby achieving a higher re-dispersion of the nickel and regaining up to 100% of the original activity and/or sulfur capacity.

In an embodiment according to the first aspect of the invention, nickel is the only catalytically active element in the spent catalyst.

The above refresh reaction also works on spent catalysts containing nickel in oxidic form as e.g. NiO. Hence, in an embodiment according to the first aspect of the invention, the nickel in the spent catalyst is in oxidic form.

In an embodiment according to the first aspect of the invention, the step of contacting with the nitric acid solution is conducted at room temperature i.e. 20-25° C. The duration is for instance 1-5 min. In another embodiment, the spent catalyst is heated treated at 70-80° C., such as 75° C., for a duration of at least 10 min, such as 10-120 min, e.g. 15, 30 or 60 min.

In an embodiment according to the first aspect of the invention, the drying step is conducted at 110° C.

In an embodiment according to the first aspect of the invention, the calcining step is conducted in air at 400-500° C. such as 450° C. for 1-2 hours, and the reducing step is conducted in the presence of hydrogen at 500-550° C. such as 525° C. for 2-4 hours. After drying, the dried catalyst tablets or pellets are calcined to decompose the nickel metal salt or any other metal salt to their oxides, and subsequently the metal oxide is reduced to its metallic form for obtaining the active steam reforming catalyst. The same applies when treating the structured catalyst comprising a macroscopic structure.

The spent catalyst, such as a pellet (spent catalyst (a)) is for instance contacted for one minute with a 65 wt % $HNO_3$ solution and an organic acid is added to the solution; then it is heat treated at 75° C. for 10 min or more, e.g. 15 min. The pellets are then dried at 110° C. and finally calcined and reduced as recited above.

In a second aspect of the invention, there is also provided a process for the production of a hydrogen and/or carbon monoxide rich gas, i.e. synthesis gas, by steam reforming of a hydrocarbon feedstock, the process comprising the step of contacting at 450-1100° C. the hydrocarbon feedstock such as natural gas and steam with:
  a fixed bed of a steam reforming catalyst comprising nickel on a refractory oxide support, said fixed bed of steam reforming catalyst comprising a load-mixture of: fresh steam reforming catalyst and the refreshed catalyst prepared from the spent catalyst (a) according to the first aspect of the invention;
  or
  a steam reforming catalyst comprising nickel, said steam reforming catalyst being a load-mixture of:
  fresh structured catalyst comprising a macroscopic structure, wherein said macroscopic structure is formed by a metallic material and at least partly support a refractory oxide support, and the refreshed catalyst prepared from the spent catalyst (b) according to the first aspect of the invention.

Accordingly, as in the first aspect of the invention, spent catalyst (a) is a spent steam reforming catalyst in which the nickel content is 5-20 wt % Ni and the support is an oxide comprising aluminium, zirconium, magnesium, calcium, lanthanum, yttrium, and/or cerium, and wherein the spent catalyst is provided in the form of tablets or pellets. Spent catalyst (b) is a spent steam reforming catalyst in which the nickel content is 5-20 wt % Ni, said spent steam reforming catalyst being a structured catalyst comprising a macroscopic structure, wherein said macroscopic structure is formed by a metallic material and at least partly support a refractory oxide support, in which the metallic material is preferably an alloy comprising Fe, Cr, and Al, the support is preferably zirconium oxide ($ZrO_2$);

In an embodiment according to second aspect of the invention, when operating with spent catalyst (a) the load-mixture is provided in the form of tablets or pellets, e.g. by the fresh steam reforming catalyst and the refreshed catalyst being in the form of tablets or pellets.

By using refreshed catalyst as part of a load mixture of steam reforming catalyst in a steam methane reformer, several advantages are obtained, despite the "dilution" of a fresh catalyst with a refreshed catalyst having e.g. a lower catalytic activity. For instance, the customer or plant operator gains flexibility in the catalyst supply and instead of purchasing fresh catalyst, refreshed catalyst can be used in a large portion of e.g. the steam reformer tubes of the steam reforming unit, here for instance a tubular reformer.

As used herein, the term "load-mixture" means a mixture of fresh steam reforming catalyst, i.e. new catalyst not previously been subjected to steam reforming, and the refreshed catalyst prepared, i.e. produced, according to the first aspect of the invention, and thus subjected to steam reforming. The new catalyst is normally supplied externally as it has to be supplied from the catalyst production site, while the refreshed catalyst is sourced internally as it is produced by the regeneration method.

Again, since the shape or structure of the spent catalyst is preserved during the regeneration, the operation is simple as there is no need for pulverizing the spent catalyst for thereby incorporating it as raw material farther upstream in the plant and/or production process for producing the new catalyst. As mentioned before, catalyst production sites are located in different regions e.g. countries than the actual operation site where steam reforming is conducted. By the present invention, the refreshed catalyst is suitably combined at the operation site with the fresh steam reforming catalyst. It would thus be understood that the refreshed catalyst is not inherently mixed with the fresh steam reforming catalyst, as for instance disclosed in the above cited CN 103506122 A and CN 108067242 A, for thereby producing a new catalyst which will then need to be supplied to the operation site. Accordingly, the load-mixture of the present invention is a mixture of individually separated catalyst entities: new steam reforming catalyst and refreshed catalyst.

Where regaining up to 100% of the original activity of the catalyst, suitably by repeating the steps of contacting and heat-treating at least once prior to said calcining or drying steps, with the use of an organic acid, an even higher flexibility is achieved as the proportion of refreshed catalyst can be further increased.

When operating with spent catalyst (a), the steam reforming is suitably conducted in: a convection reformer, preferably comprising one or more bayonet reforming tubes such as an HTCR reformer i.e. TopsØe bayonet reformer, where the heat for reforming is transferred by convection along with radiation; a tubular reformer i.e. conventional steam methane reformer (SMR), where the heat for reforming is transferred chiefly by radiation in a radiant furnace; autothermal reformer (ATR), where partial oxidation of the hydrocarbon feed with oxygen and steam followed by catalytic reforming; or combinations thereof.

In another embodiment, when operating with spent catalyst (a), the steam reforming is pre-reforming, thus suitably conducted in a pre-reforming unit. as is also well-known in the art.

For more information on these reformers, details are herein provided by direct reference to Applicant's patents and/or literature. For instance, for tubular and autothermal reforming an overview is presented in "Tubular reforming and autothermal reforming of natural gas—an overview of available processes", Ib Dybkjær, Fuel Processing Technology 42 (1995) 85-107; and EP 0535505 for a description of HTCR. For a description of ATR and/or SMR for large scale hydrogen production, see e.g. the article "Large-scale Hydrogen Production", "Jens R. Rostrup-Nielsen and Thomas Rostrup-Nielsen": https://www.topsoe.com/sites/default/files/topsoe_large_scale_hydrogen_produc.pdf When operating with spent catalyst (b), the steam reforming is conducted in an electrically heated steam methane reformer (e-SMR), where electrical resistance is used for generating the heat for catalytic reforming.

For a description of e-SMR which is a more recent technology, reference is given to e.g. the above-mentioned WO 2019/228797 A1.

In an embodiment according to the second aspect of the invention, the refreshed catalyst is 40 wt % or less of said load mixture.

Any of the embodiments according to the first aspect of the invention may be used together with any of the embodiments according to the second aspect of the invention, or vice-versa.

EXAMPLES

Sulfur Capacity.

1 g of catalyst crushed down to 2.8-4 mm sieve fraction is placed in the reactor. A gas mixture with composition 14 ppm $H_2S$ in 200 Nl/h $H_2$, 2 g/h $H_2O$, is led over the catalyst at 550° C. for 2 to 4 days. After sulfidation the catalyst is analysed for sulfur.

Methane Steam Reforming Activity.

10 to 50 mg of catalyst crushed down to 125-300 μm sieve fraction is placed in the reactor. A gas mixture with composition 0.8 Nl/h $H_2$, 2 Nl/h $CH_4$ and 6.45 g/h of water is passed through the catalyst. The conversion of $CH_4$ is measured by GC at 500 and 450° C. The activity is given as moles of $CH_4$ converted/h/g of catalyst.

Method for Regenerating Catalytic Activity.

Six (6) pellets of spent catalyst (spent catalyst is used catalyst from industry), or lab-aged catalyst, was immersed in 150 g's of 65 wt % $HNO_3$ at room temperature, i.e. 20-25° C. After one minute, the pore volume is filled with the nitric acid, and the pellets are withdrawn from the liquid and placed in a heating cupboard at 75° C. After a couple of minutes, the refresh reaction starts with evolution of $NO_2$:

$$Ni+4HNO_3=Ni(NO_3)_2+2NO_2+2H_2O$$

The reaction is completed in 15 minutes, whereby the pellets are dried at 110° C., calcined, reduced and ready for testing. The results are presented in Table 1 in a spent catalyst having $MgAl_2O_4$ as the support (carrier) and a spent catalyst having an alumina support with hibonite as one of the calcium aluminate phases. The table shows that the large sintered nickel particles are dissolved and re-dispersed during calcination and reduction, thus regaining some of the sulfur capacity and the activity.

Even better values of activity and sulfur adsorption capacity (S-capture) are obtained when an organic acid is used as promotor. The organic acid promotor effect on the nickel particle size is also unexpected, since despite resulting in a larger nickel size, the S-capture significantly increases. This may also reflect the fact, that the use of XRPD (X-Ray Powder Diffraction) for determining particle size gives an average particle size, covering both small re-dispersed nickel particles and big nickel particles.

TABLE 1

| Catalyst support | | Ni (wt %) | S-capture (ppm) | H-BET (m²/g) | Organic acid promotor* | Ni size** (Å) | Activity (mol/g/h) at 500° C./450° C. |
|---|---|---|---|---|---|---|---|
| MgAl₂O₄ | fresh | 15.3 | 2610 | 18.9 | none | 135 | 2.4/0.68 |
| MgAl₂O₄ | Spent | 14.3 | 230 | 7.68 | none | 637 | 0.15/0.04 |
| MgAl₂O₄ | Refresh (15 min) | — | 980 | — | none | 244 | 1.1/0.3 |
| MgAl₂O₄ | Refresh (15 min) | — | 1010 | 11.4 | 1 | 365 | 1.24/0.35 |
| MgAl₂O₄ | Refresh (15 min) | — | 1240 | 11.2 | 2 | 229 | 1.39/0.41 |
| MgAl₂O₄ | Refresh (15 min) | — | 1340 | 13 | 3 | 247 | 1.45/0.41 |
| Hibonite | fresh | 13.8 | 1390 | 7.48 | none | 163 | 1.3/0.34 |
| Hibonite | spent | 13.9 | 250 | 2.99 | none | 605 | 0.16/0.04 |
| Hibonite | Refresh (15 min) | — | 720 | — | none | 274 | 0.36/0.10 |
| Hibonite | Refresh (15 min) | — | 1170 | 8.25 | 1 | 272 | 0.70/0.21 |

*1: 2-hydroxypropane-1,2,3-tricarboxylic acid; 2: ethanedioic acid; 3: 1,4-butanedioic acid.
**Ni particle size is determined from XRPD Moreover, by repeating the steps of contacting and heat-treating at least once prior to said calcining or drying steps, with the use of an organic acid, it is also possible in a quick and efficient manner to regain up to 100% of the original activity of the catalysts.

The invention claimed is:

1. A method of regenerating the catalytic activity of a spent catalyst comprising nickel, said spent catalyst being:
    (a) a spent steam reforming catalyst comprising a support, in which the nickel content is 5-20 wt % Ni and the support is an oxide comprising aluminium, zirconium, magnesium, calcium, lanthanum, yttrium, and/or cerium, and wherein the spent catalyst is provided in the form of tablets or pellets,
or
    (b) a spent steam reforming catalyst in which the nickel content is 5-20 wt % Ni, said spent steam reforming catalyst being a structured catalyst comprising a macroscopic structure, wherein said macroscopic structure is formed by a metallic material and at least partly supported by a refractory oxide support;
said method comprising the steps of:
    i) contacting the spent catalyst with a nitric acid solution, in which the nitric acid solution is at least 60 wt % HNO₃, and adding one or more organic acids;
    ii) heat-treating the spent catalyst at a suitable temperature for reacting nickel with nitric acid, said suitable temperature being in the range 50-100° C., and subsequently drying the spent catalyst at 100-125° C.; and
    iii) calcining and reducing the spent catalyst, in which the calcining is conducted in air at 500-1300° C. for 1-4 hours, and the reducing is conducted in the presence of hydrogen at 400-600° C. for 2-4 hours,
    wherein the tablets or pellets of spent catalyst (a) are spherical, oblong, cylindrical, multilobe, ring-shaped, or any combinations thereof;
    wherein the macroscopic structure of spent catalyst (b) is a monolith; and
    wherein the shape of the spent catalyst (a) or the macroscopic structure of the spent catalyst (b) is preserved during the regenerating method.

2. The method of claim 1, wherein the one or more organic acids are selected from the group consisting of: 2-hydroxypropane-1,2,3-tricarboxylic acid, 2-hydroxypropanoic acid, ethanedioic acid, propanedioic acid, 1,4-butanedioic acid, 1,3-propanedicarboxylic acid, and 2-aminopentanedioic acid.

3. The method of claim 2, wherein the content of the one or more organic acids in nitric acid solution is 40 wt % or less.

4. The method of claim 1, wherein the nitric acid solution is free of other inorganic acids.

5. The method of claim 1, wherein the steps of contacting and heat-treating are repeated at least once prior to said drying or calcining.

6. The method of claim 1, wherein nickel is the only catalytically active element in the spent catalyst.

7. The method of claim 1, wherein the nickel in the spent catalyst is in oxidic form.

8. The method of claim 1, wherein the step of contacting with the nitric acid solution is conducted at 20-25° C.

9. The method of claim 8, wherein the spent catalyst is heat-treated at 70-80° C. for a duration of at least 10 min.

10. The method of claim 1, wherein the drying is conducted at 110° C.

11. The method of claim 1, wherein the calcining is conducted in air at 400-500° C. for 1-2 hours, and the reducing is conducted in the presence of hydrogen at 500-550° C. for 2-4 hours.

12. The method of claim 1, wherein the metallic material is an alloy comprising Fe, Cr, and Al, and the support is zirconium oxide (ZrO₂).

13. The method of claim 1, wherein said method consists of the steps of:
    i) contacting the spent catalyst with a nitric acid solution, in which the nitric acid solution is at least 60 wt % HNO₃, and adding one or more organic acids;
    ii) heat-treating the spent catalyst at a suitable temperature for reacting nickel with nitric acid, said suitable temperature being in the range 50-100° C., and subsequently drying the spent catalyst at 100-125° C.; and
    iii) calcining and reducing the spent catalyst, in which the calcining is conducted in air at 500-1300° C. for 1-4 hours, and the reducing is conducted in the presence of hydrogen at 400-600° C. for 2-4 hours.

* * * * *